April 18, 1950  A. F. SANNER, JR  2,504,279
HAY SALTING ATTACHMENT FOR HAY BALERS
Filed July 12, 1949
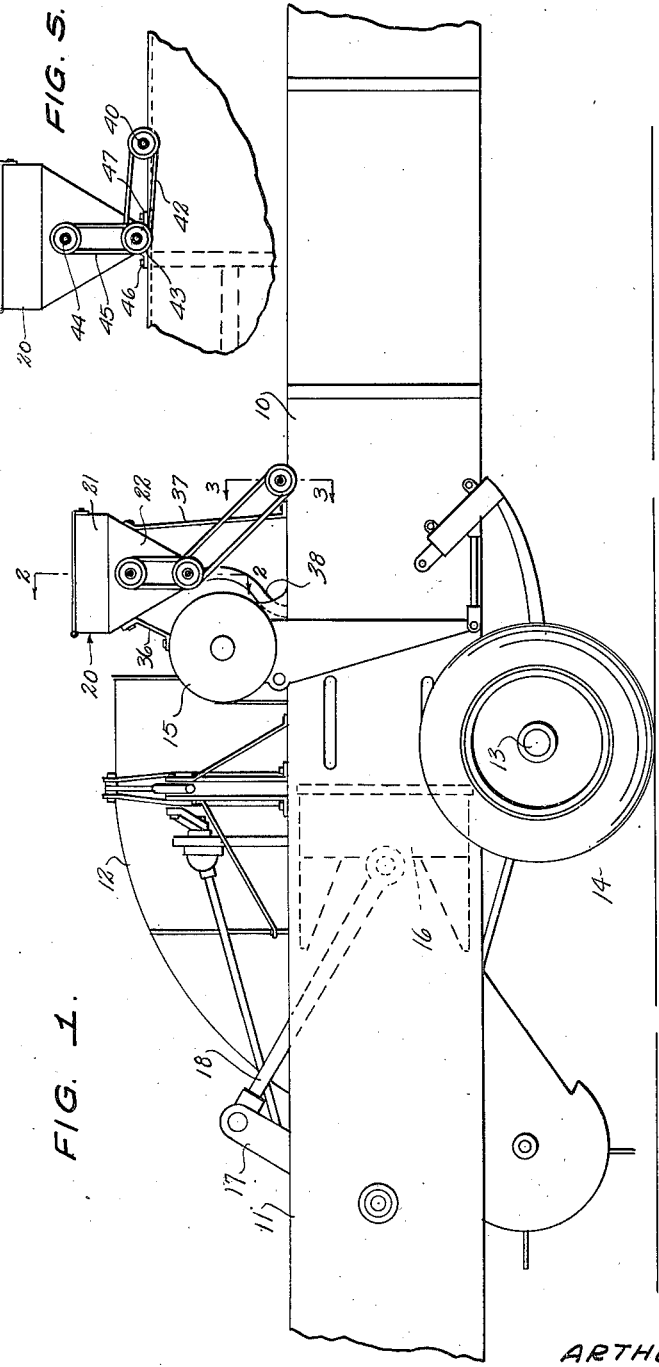
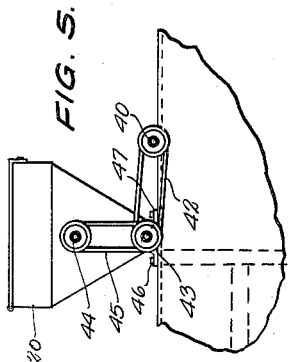
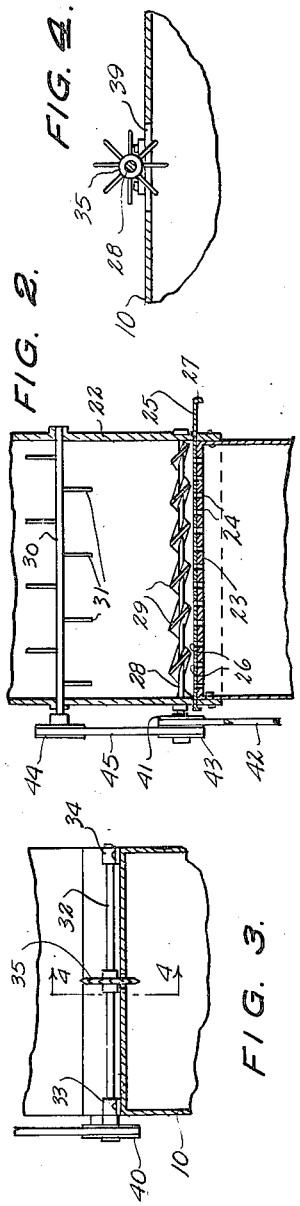
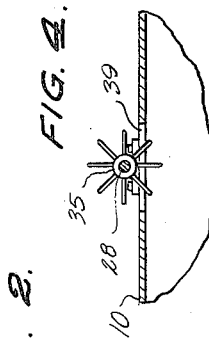
INVENTOR.
ARTHUR F. SANNER, JR.
BY
McMorrow, Berman + Davidson
ATTORNEYS.

Patented Apr. 18, 1950

2,504,279

UNITED STATES PATENT OFFICE 2,504,279

HAY SALTING ATTACHMENT FOR HAY BALERS

Arthur F. Sanner, Jr., Circleville, Kans.

Application July 12, 1949, Serial No. 104,171

3 Claims. (Cl. 99—235)

This invention relates to attachments for hay balers, and more particularly to an attachment for distributing seasoning or preservative material, such as salt, through hay as the hay is being baled.

It is among the objects of the invention to provide an attachment which can be quickly and easily mounted on a hay baler, of either the stationary or pick-up type, without any material modification of the baler structure, which can be conveniently disposed adjacent the baler plunger or other compressing means and operated by the movement of compressed hay through the baler to sift the material through the hay as it is being compressed, which is operative only when hay is being compressed, and which is simple and durable in construction, fully automatic in operation, and economical to manufacture and install.

Other objects and advantages will become apparent from a consideration of the following description and the appended claims in conjunction with the accompanying drawing, wherein:

Figure 1 is a side elevation of a fragmentary portion of a hay baler with a salt-distributing attachment illustrative of the invention operatively installed thereon;

Figure 2 is a longitudinal cross-section of the attachment on the line 2—2 of Figure 1;

Figure 3 is a transverse cross-section of a fragmentary portion of the baler on the line 3—3 of Figure 1;

Figure 4 is a longitudinal cross-section of a fragmentary portion of the attachment and the baler on the line 4—4 of Figure 3; and Figure 5 is a side elevation of a somewhat modified salt distributor arrangement.

With continued reference to the drawing, the baler therein illustrated is of the "pick-up" type and comprises a bale chamber 10, a plunger chamber 11 continuous and in alignment with the bale chamber at one end of the latter, pick-up mechanism 12 operative to gather hay from the ground and feed the hay into the plunger chamber at the junction of the latter with the bale chamber, a supporting axle 13 transversely disposed beneath the plunger and bale chambers and the pick-up mechanism, wheels 14 journaled on the axle 13 at respectively opposite ends of the axle and supporting the baler, and bale-tying mechanism 15 carried on the bale chamber near the juncture of the bale chamber with the plunger chamber 11. A plunger 16 reciprocates in the plunger chamber 11 and is driven by a crank 17 connected to the plunger by a pitman or connecting rod 18.

The attachment comprises a hopper, generally indicated at 20, including a rectangular upper portion 21 having side walls spaced from and substantially parallel to each other, and end walls disposed at respectively opposite ends of the side walls and substantially parallel to each other, and a lower portion 22 having generally triangular-shaped end walls depending from the end walls of the upper portion, respectively, and downwardly-converging side walls. A fixed V-plate 23 extends longitudinally of the hopper at the bottom thereof and between the bottom edges of the converging side walls of the lower portion 22 of the hopper, and has a series of spaced-apart openings or apertures 24 therein. A plate 25 is slidably mounted on the upper surface of the plate 23 and is provided with a series of spaced-apart apertures 26 which are variably registrable with the apertures 24 and plate 23 upon longitudinal sliding of the plate 25 on the plate 23 to regulate the openings through the two plates and thereby control the feed of material, such as salt, from the hopper through the feed plates 23 and 25. The plate 25 projects from one end of the hopper and is provided on its outer end, with a handle 27 by means of which the plate 25 can be manually adjusted relative to the plate 23.

A shaft 28 is journaled in the hopper and extends longitudinally of the hopper within the latter and immediately above the feed plate 25, and agitating means, such as the auger structure 29, is provided on this shaft to work material, such as salt, contained in the hopper through the openings in the plates 23 and 25 upon rotation of the shaft 28.

A second shaft 30 is journaled in the hopper and extends longitudinally of the hopper interiorly of the latter above and substantially parallel to the plate 28. Suitable means, such as the radially-projecting, spaced apart and staggered arms 31 are provided on the second shaft 30 to work the salt above the feed agitator 29 and crumble all lumps in the salt and reduce the salt to a condition in which it will pass freely through the openings in the plates 23 and 25.

A third shaft 32 is journaled on the top of the bale chamber 10 of the baler by suitable means, such as the pillow blocks 33 and 34, disposed at respectively opposite sides of the bale chamber 10 and receiving the shaft 32 near respectively opposite ends of the latter. This shaft extends transversely of the bale chamber, and a star wheel 35 is secured on this shaft at a location intermediate the length of the shaft.

In the arrangement illustrated in Figure 1, because of space limitations caused by the bale-tying mechanism 15, or other apparatus, the hopper 20 is mounted in an elevated position above the bale chamber by suitable means, such as the braces 36 and 37, and a sheet metal spout 38 of narrow, elongated, cross-sectional shape extends from the bottom end of the hopper to the top of the bale chamber and the top wall of the bale chamber is provided with an elongated slot registering with the bottom end of the spout 38. The bottom end of the spout 38 is located near the front end of the plunger chamber, so that the salt will be applied to the hay as the bales are being formed and will sift down through the hay as the plunger operates rather than being deposited on the top sides of the bales. The third shaft 32 is disposed at a location spaced forwardly of the spout 38 where the bales have been formed and are moved outwardly or forwardly through the bale chamber 10. The star wheel 35 engages the upper sides of the bales as they move through the bale chamber, a slot 39 being provided in the top wall of the bale chamber through which the star wheel extends. Movement of the bales through the bale chamber rotates the star wheel 35 which in turn rotates the third shaft 32.

A belt pulley 40 is secured on the shaft 32, at one end of the latter, and a corresponding belt pulley 41 is secured on the shaft 28 at the corresponding end of this shaft. A V-belt 42 drivingly connects the belt pulley 40 to the belt pulley 41, so that the shaft 28 will be rotated when the shaft 32 is rotated by the movement of bales through the bale chamber. A second belt pulley 43 is secured on the shaft 28 adjacent the belt pulley 41, and a complementary belt pulley 44 is secured on the shaft 30 at the corresponding end of this shaft, and a V-belt 45 drivingly connects the belt pulleys 43 and 44, so that the shaft 30 will be rotated when the shaft 28 is rotated by the shaft 32.

With this arrangement, salt will be fed from the hopper 20 into the end of the bale chamber in which the bales are formed only as hay is fed into the baler and the bales are forced outwardly through the bale chamber. The application of salt to the hay is thus automatically controlled, no salt being fed into the baler when bales are not being formed therein.

In the somewhat modified arrangement shown in Figure 5, the hopper 20 is mounted with its lower end substantially in contact with the upper side of the bale chamber and is secured to the bale chamber by suitable means, such as the brackets 46 and 47. This arrangement is possible where there is sufficient space to mount the hopper directly on the bale chamber at the end of the chamber in which the bales are formed. Otherwise, the construction is the same as that illustrated in Figures 1 to 4 inclusive, and described above.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, itended to be embraced therein.

What is claimed is:

1. A salt-distributing attachment for a hay baler comprising an elongated hopper having a length substantially equal to the width of the bale chamber of a baler, means mounting said hopper on the bale chamber of a baler to extend transversely of the bale chamber at the location at which the bales are formed therein, adjustable feed plates carried by said hopper at the bottom end thereof, a first shaft journaled in said hopper and extending longitudinally interiorly thereof immediately above said feed plates, salt-agitating means on said first shaft, a second shaft journaled in said hopper and extending longitudinally thereof above said first shaft, salt-crumbling means on said second shaft, a third shaft journaled on the bale chamber at a location at which formed bales move through the chamber, a star wheel on said third shaft engaging bales in the bale chamber to drive said third shaft as the bales move through the chamber, and means drivingly connecting said third shaft to said first and second shafts to operate said agitating and salt-crumbling means.

2. A salt-distributing attachment for a hay baler comprising an elongated hopper having a length substantially equal to the width of the bale chamber of a baler, means mounting said hopper on the bale chamber of a baler to extend transversely of the bale chamber at the location at which the bales are formed therein, adjustable feed plates carried by said hopper at the bottom end thereof, a first shaft journaled in said hopper and extending longitudinally thereof immediately above said feed plates, salt-agitating means on said first shaft, a second shaft journaled on the bale chamber at a location at which formed bales move through the chamber, a star wheel on said second shaft engaging bales in the bale chamber to drive said second shaft as the bales move through the chamber, and means drivingly connecting said shafts to operate said salt-agitating means.

3. A salt-distributing attachment for a hay baler comprising an elongated hopper having a length substantially equal to the width of the bale chamber of a baler, means supporting said hopper above the bale chamber of a baler to extend transversely of the bale chamber adjacent the location at which the bales are formed, adjustable feed plates carried by said hopper at the bottom end thereof, a spout of elongated, rectangular cross-section extending from the bottom end of said hopper to said bale chamber at a location at which the bales are formed therein, a first shaft journaled in said hopper and extending longitudinally thereof immediately above said feed plates, salt-agitating means on said first shaft, a second shaft journaled on the bale chamber at a location at which formed bales move through the chamber, a star wheel on said second shaft engaging bales in the bale chamber to drive said second shaft as the bales move through the chamber, and means drivingly connecting said shafts to drive said salt-agitating means.

ARTHUR F. SANNER, Jr.

No references cited.